US009491716B2

(12) United States Patent
Sawai et al.

(10) Patent No.: US 9,491,716 B2
(45) Date of Patent: Nov. 8, 2016

(54) COMMUNICATION CONTROL DEVICE, COMMUNICATION CONTROL METHOD, PROGRAM, AND COMMUNICATION CONTROL SYSTEM

(71) Applicant: Sony Corporation, Tokyo (JP)

(72) Inventors: Ryo Sawai, Tokyo (JP); Berkan Dulek, Ankara (TR); Sinan Gezici, Ankara (TR)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/409,609

(22) PCT Filed: May 28, 2013

(86) PCT No.: PCT/JP2013/064777
§ 371 (c)(1),
(2) Date: Dec. 19, 2014

(87) PCT Pub. No.: WO2014/007001
PCT Pub. Date: Jan. 9, 2014

(65) Prior Publication Data
US 2015/0156729 A1 Jun. 4, 2015

(30) Foreign Application Priority Data

Jul. 5, 2012 (JP) ................. 2012-151240

(51) Int. Cl.
*H04W 52/24* (2009.01)
*H04W 16/14* (2009.01)
*H04W 52/28* (2009.01)

(52) U.S. Cl.
CPC ........... *H04W 52/243* (2013.01); *H04W 16/14* (2013.01); *H04W 52/24* (2013.01); *H04W 52/283* (2013.01); *H04W 52/244* (2013.01)

(58) Field of Classification Search
CPC .......................... H04W 52/243; H04W 52/283
USPC ....... 455/522, 67.13, 69, 63.1, 456.1, 456.3, 455/501, 67.11
See application file for complete search history.

(56) References Cited

U.S. PATENT DOCUMENTS

| 2010/0330919 | A1* | 12/2010 | Gurney ............... H04W 52/367 455/67.11 |
|---|---|---|---|
| 2011/0028179 | A1 | 2/2011 | Sawai et al. |
| 2011/0034204 | A1* | 2/2011 | Sawai ................. H04W 52/283 455/522 |
| 2013/0102350 | A1 | 4/2013 | Sawai et al. |
| 2014/0155118 | A1 | 6/2014 | Tsuda |

FOREIGN PATENT DOCUMENTS

| JP | 2011-166721 A | 8/2011 |
|---|---|---|
| WO | WO 2011/038881 A1 | 4/2011 |

OTHER PUBLICATIONS

Inage et al., Spectrum Sharing Based on Capacity Conservation Ratio of Primary User. IEICE Technical Report. May 2009; 109(61):13-20.

* cited by examiner

*Primary Examiner* — John J Lee
(74) *Attorney, Agent, or Firm* — Wolf, Greenfield & Sacks, P.C.

(57) ABSTRACT

Provided is a communication control device including a power control unit configured to determine a transmission power of a wireless signal, which is transmitted from an interfering device, by using a fading index that is estimated based on a change in a relative distance between the interfering device and an interfered device.

26 Claims, 7 Drawing Sheets

COMMUNICATION CONTROL DEVICE, COMMUNICATION CONTROL METHOD, PROGRAM, AND COMMUNICATION CONTROL SYSTEM

CROSS REFERENCE TO RELATED APPLICATIONS

This is a U.S. National Stage Application under 35 U.S.C. §371, based on International Application No. PCT/JP2013/064777, filed May 28, 2013, which claims priority to Japanese Patent Application JP 2012-151240, filed Jul. 5, 2012, each of which is hereby incorporated by reference in its entirety.

TECHNICAL FIELD

The present disclosure relates to a communication control device, a communication control method, a program, and a communication control system.

BACKGROUND ART

As indicated by the Federal Communications Commission (FCC), the main cause of depletion of frequency resources for wireless communication is an inefficient frequency allocation policy (see Non-Patent Literature 1 below). Most of the frequency resources are allocated to a particular service provider with an exclusive license, and a strict constraint is imposed on the transmission power on the frequency resources in order to prevent a mutual interference. Under such conditions, a cognitive radio that is a wireless communication device capable of adaptively changing an operation parameter has been developed. With the advent of the cognitive radio, a new policy has been developed in many countries in order to open frequency resources within the range of not causing harmful interference with an unlicensed user.

A system of a service provider that has a license for a certain frequency channel is referred to as a primary system (PS). On the other hand, a system that secondarily uses the frequency channel protected for the sake of the primary system is referred to as a secondary system (SS). Approaches to the secondary use of the frequency channel are classified into two groups. The first approach is an opportunistic spectrum access that monitors the frequency resource of the primary system to detect the absence of a PS user and allows an SS user to use a so-called spectrum hole that has been detected (see Non-Patent Literature 2 below). The second approach is spectrum sharing that recognizes the coexistence of a PS user and an SS user and controls parameters such as the transmission power of the secondary system in order to prevent the SS user from giving interference exceeding an allowable level to the PS user (see Non-Patent Literature 3 below). Every approach is important in terms of the efficient use of frequency resources.

CITATION LIST

Non-Patent Literature

Non-Patent Literature 1: Federal Communications Commission, "Spectrum policy task force" ET Docket No. 02-135, November 2002, Technical Report Non-Patent Literature 2: J. Mitola and G. Q. Maguire, "Cognitive radio: Making software radios more personal" IEEE Personal Communications, vol. 6, no. 4, pp. 13-18, August 1999

Non-Patent Literature 3: S. Haykin, "Cognitive radio: Brain-empowered wireless communications" IEEE Journal on Selected Areas in Communication, vol. 23, no. 2, pp. 201-220, February 2005

SUMMARY OF INVENTION

Technical Problem

In the above-described second approach, that is, the spectrum sharing, interference given to the PS user is often estimated by subtracting a path loss (from the SS user to the PS user) from the transmission power of the SS user. The path loss depends on not only the distance between the users but also fading and varies temporally. Therefore, in an existing method, interference is estimated based on the average value or the minimum value of a path loss estimated within a predetermined period of time, to determine the transmission power of the SS user. However, according to the existing method, even when the path loss increases within a short time, the SS user cannot efficiently use a margin of a power increase caused by the increase in the path loss. Therefore, the communication capacity of the secondary system is not optimized. On the other hand, close signaling between a transmitting side and a receiving side is necessary to estimate a varying path loss with high accuracy. Therefore, when interference is estimated based on the path loss in a short cycle, a signaling overhead increases.

Therefore, it is desirable to implement a mechanism that makes it possible for the secondary system to use the frequency resources more efficiently than the existing method, without excessively increasing the signaling overhead.

Solution to Problem

According to the present disclosure, there is provided a communication control device including a power control unit configured to determine a transmission power of a wireless signal, which is transmitted from an interfering device, by using a fading index that is estimated based on a change in a relative distance between the interfering device and an interfered device.

Further, according to the present disclosure, there is provided a communication control method, which is executed by a communication control device that controls a transmission power of an interfering device, the communication control method including determining a transmission power of a wireless signal, which is transmitted from the interfering device, by using a fading index that is estimated based on a change in a relative distance between the interfering device and an interfered device.

Further, according to the present disclosure, there is provided a program for causing a computer, which controls a communication control device, to function as a power control unit configured to determine a transmission power of a wireless signal, which is transmitted from an interfering device, by using a fading index that is estimated based on a change in a relative distance between the interfering device and an interfered device.

Further, according to the present disclosure, there is provided a communication control system including a wireless communication device of a second wireless communication system located in a cell of a first wireless communication system, and a communication control device configured to determine a transmission power of a wireless signal, which is transmitted from the wireless communication device, not to give harmful interference to the first wireless communication system, by using a fading index that is estimated based on a change in a relative position of the wireless communication device.

Advantageous Effects of Invention

According to the technology of the present disclosure, the communication capacity of the secondary system may be increased in comparison with the existing method without excessively increasing the signaling overhead.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

In addition, description will be provided in the following order.
1. Overview
  1-1. Spectrum sharing
  1-2. Technical problem
  1-3. New interference model
2. Example of configuration of communication control system
  2-1. Summary of system
  2-2. Example of configuration of communication control device
  2-3. Flow of process
3. Conclusion 1. Overview

Figure 1:
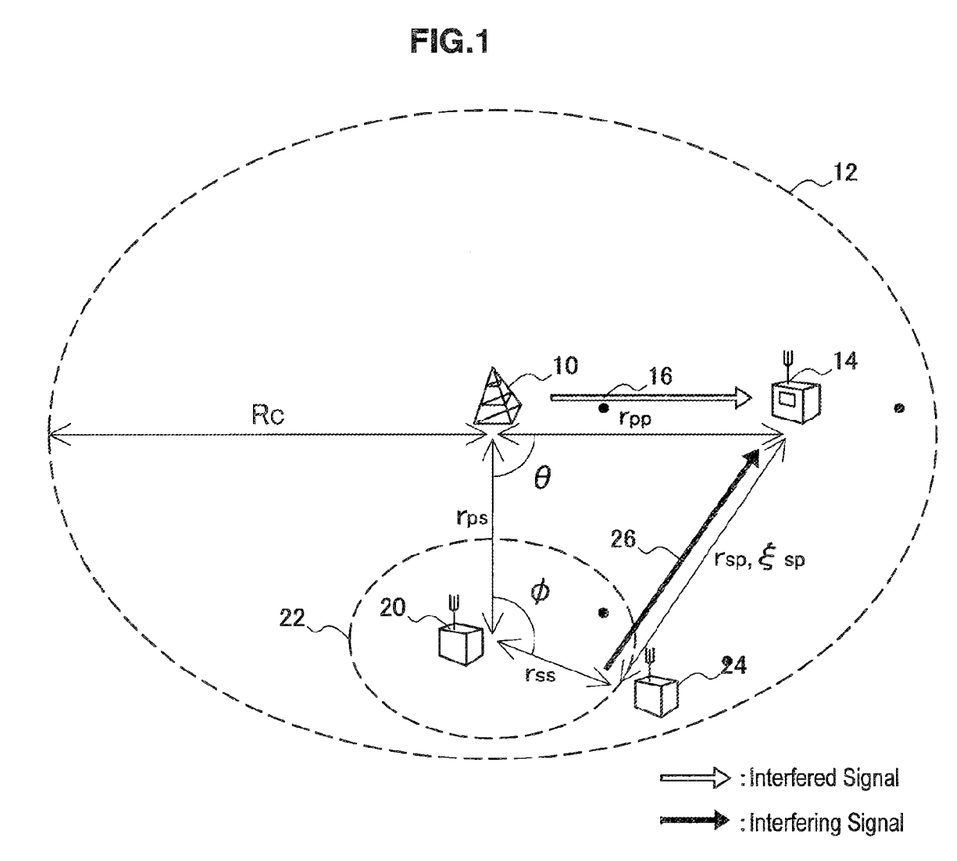
FIG. 1 is an illustrative diagram for illustrating a scheme of spectrum sharing.

[1-1. Spectrum Sharing]
FIG. 1 is an illustrative diagram for illustrating a scheme of spectrum sharing related to the technology of the present disclosure. Referring to FIG. 1, a base station (hereinafter referred to as a PS base station) 10 of a primary system is illustrated. The primary system is a wireless communication system of a service provider having a license for a certain frequency channel. The PS base station 10 provides a wireless communication service to one or more terminals (hereinafter referred to as PS terminals) 14 of the primary system that are located in a cell 12 on a licensed frequency channel. Herein, when the number of active PS terminals located in the cell 12 is small, a surplus (an unused resource) is generated in a frequency resource of the primary system. When an unlicensed service provider cannot at all use a frequency channel protected for the sake of the primary system, the use efficiency of frequency resources is degraded. On the other hand, when the unlicensed service provider can freely operate its own wireless communication service, harmful interference may be generated in the wireless communication service of the primary system that should be naturally protected. Thus, from the viewpoint of the improvement of the use efficiency of frequency resources, it is approved that the unlicensed service provider secondarily uses a surplus frequency resource of the primary system within the range of not causing harmful interference.

In the example of FIG. 1, a base station (hereinafter referred to as an SS base station) 20 that is a master node of the primary system and one or more terminals (hereinafter referred to as SS terminals) 24 of the secondary system are located in the cell 12 of the primary system. The SS base station 20 is a communication control device that operates the secondary system by secondarily using a frequency channel that is protected for the sake of the primary system. The SS base station 20 may be, for example, a wireless access point, a femto cell base station, a hot zone base station, a remote radio head (RRH), or a device having other types of cognitive radio functions. Herein, for example, when a wireless signal 26 is transmitted from the SS terminal 24 at the same timing as the transmission of a downlink signal 16 from the PS base station 10, the wireless signal 26 may interfere with the downlink signal 16 in the PS terminal 14. Thus, the SS base station 20 controls the transmission power of the SS terminal 24 so that an interference level observed in the PS terminal 14 does not exceed an allowable level. Also, the SS base station 20 controls the transmission power of the SS base station 20 in the same manner. Accordingly, safe spectrum sharing between the primary system and the secondary system is realized. Also, when the secondary system transmits a wireless signal at the timing of uplink transmission (not downlink transmission), the PS base station 10 is a protection target in spectrum sharing.

[1-2. Technical Problem]
In general, interference given to the primary system is estimated by subtracting a path loss between an interfering device (for example, the SS terminal 24 of FIG. 1) of the secondary system and an interfered device (for example, the PS terminal 14 of FIG. 1) of the primary system from the transmission power of the interfering device. However, the path loss depends on not only the position of a terminal but also fading factors such as multipath fading and shadow fading and varies temporally. Therefore, it is difficult to accurately estimate the path loss in a short cycle. Thus, in the existing method, the average value or the minimum value of a path loss estimation value is calculated for each period having a predetermined time length, and the transmission power of the secondary system is controlled based on an indicator thereof.

Figure 2:
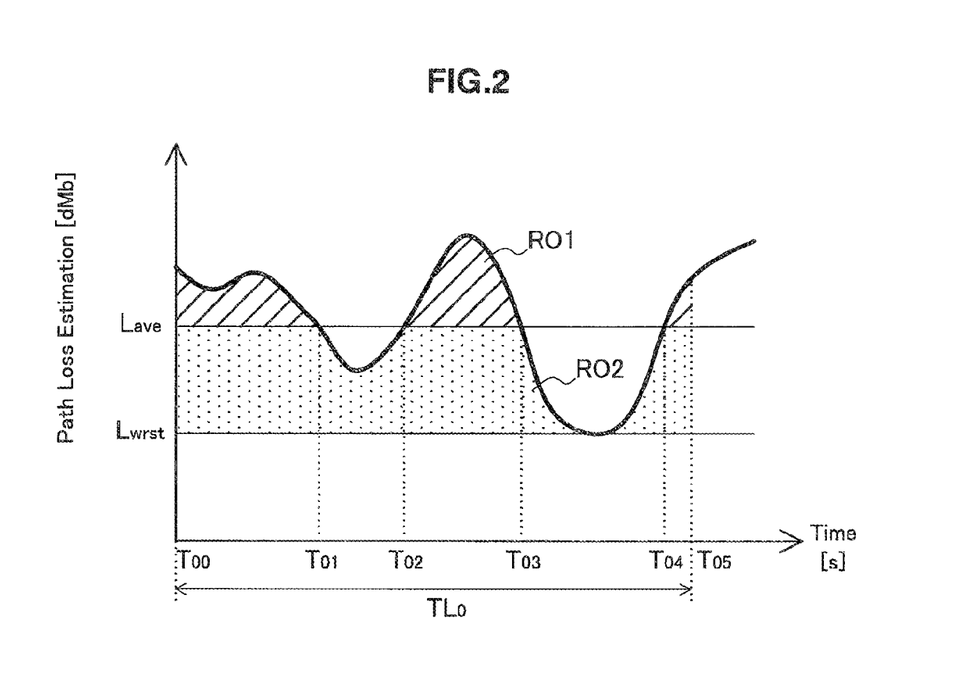
FIG. 2 is an illustrative diagram for illustrating an example of an existing method for controlling the transmission power of a secondary system.

FIG. 2 is an illustrative diagram for illustrating an example of an existing method for controlling the transmission power of a secondary system. In FIG. 2, a horizontal axis represents time and a vertical axis represents a path loss estimation value, and a temporally-varying path loss estimation value is graphed. In the existing method, for example, an average value $L_{ave}$ or a minimum value $L_{wrst}$ of the path loss estimation value over a period $TL_0$ is calculated. Then, by using the average value $L_{ave}$ or the minimum value $L_{wrst}$, the transmission power of the secondary system is determined within the range of not giving interference exceeding an allowable level to the primary system.

Here, for example, in periods of a time $T_{00}$ to a time $T_{01}$, a time $T_{02}$ to a time $T_{03}$, and a time $T_{04}$ to a time $T_{05}$, the path loss estimation value exceeds the average value $L_{ave}$. Thus, when the transmission power of the secondary system is determined by using the average value $L_{ave}$, the transmission power corresponding to an area RO1 hatched in the drawing is not used while being able to be naturally used. Also, when the transmission power of the secondary system is determined by using the minimum value $L_{wrst}$, the transmission power corresponding to both the area RO1 and an area RO2 shaded with dots in the drawing is not used while being able to be naturally used. This inefficiency may be solved by shortening the period $TL_0$. However, this solution may cause the demerit of an increase in the signaling overhead for estimating and feeding back a path loss in a short cycle.

[1-3. New Interference Model]

(1) Basic Principle

Figure 3:
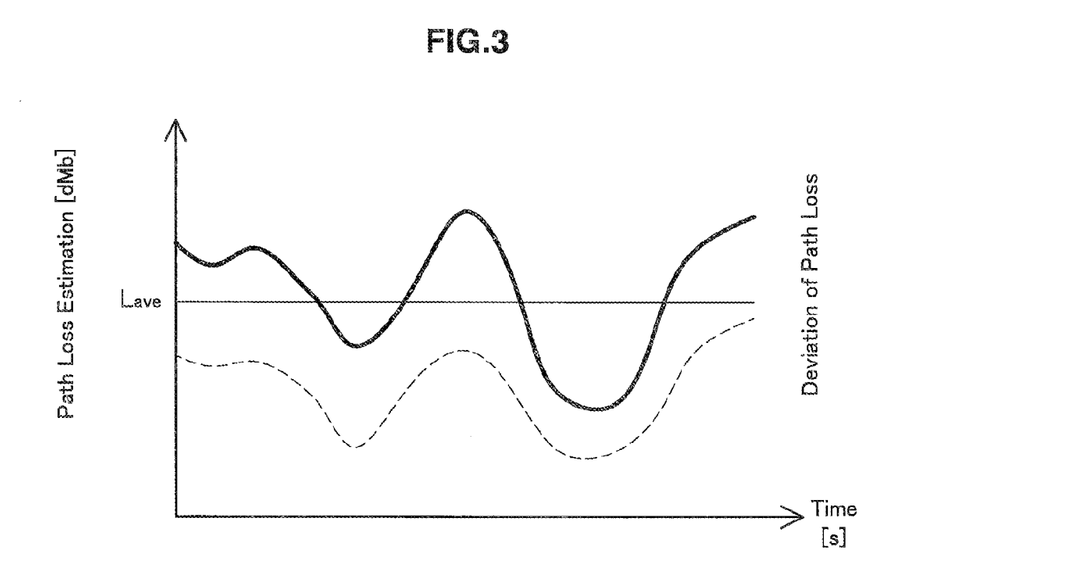
FIG. 3 is an illustrative diagram for conceptually illustrating a new interference model.

Therefore, the technology of the present disclosure introduces a new interference model for controlling transmission power by using a fading index instead of a path loss, which may be estimated more easily than the path loss. FIG. 3 is an illustrative diagram for conceptually illustrating the new interference model. In the example of FIG. 3, a dashed graph represents a deviation of a path loss estimation value. In general, when a contribution of fading changes, a variation of a path loss changes together with the path loss. Thus, the path loss estimation value and the deviation thereof correlate with each other. Therefore, in the new interference model, a parameter referred to as a fading index about a deviation of the path loss estimation value is employed to construct a power calculation formula as a function of the fading index. The power calculation formula is constructed to express a so-called water filling principle. Then, an instantaneous value of the fading index is estimated by a simple method, and the estimated instantaneous value is substituted into the power calculation formula to determine the transmission power of the secondary system. Therefore, the transmission power of the secondary system may be increased by the amount corresponding to the areas RO1 and RO2 illustrated in FIG. 2. Consequently, the use efficiency of frequency resources may be improved.

(2) Construction of Power Calculation Formula

The new interference model has the following assumption. That is, referring to FIG. 1, it is assumed that the PS terminal 14 is probabilistically uniformly distributed in the cell 12 of the primary system. Also, it is assumed that the SS terminal 24 is probabilistically uniformly distributed in a circular region having a radius $r_{ss}$ around the SS base station 20. Here, a radius of the cell 12 is $R_c$, a distance between the PS base station 10 and the PS terminal 14 is $r_{pp}$, a distance between the PS base station 10 and the SS base station 20 is $r_{ps}$, a distance between the SS base station 20 and the SS terminal is $r_{ss}$, a distance between the SS terminal 24 and the PS terminal 14 is $r_{sp}$, an angle between a path of the PS base station 10 to the PS terminal 14 and a path of the PS base station 10 to the SS base station 20 is $\theta$, and an angle between a path of the SS base station 20 to the PS base station 10 and a path of the SS base station 20 to the SS terminal 24 is $\phi$. Also, a fading index of an interference signal from the SS terminal 24 to the PS terminal 14 is $\xi_{SP}$.

A distance between the nodes and a joint probability density function of the angle are expressed as Formula (1) below.

[Math. 1]

$$Pr(r_{ps}, r_{pp}, \theta, \phi) = \frac{2r_{ps}r_{pp}}{\pi^2 R_C^4} \quad (1)$$

When the transmission power of a transmitter station (hereinafter referred to as an SS transmitter station; for example, the SS terminal 24) of the secondary system, which is separated from the SS base station 20 by the distance $r_{ss}$, is represented by $P_S(r_{ss}, \xi_{SP})$ as a function of the fading index $\xi_{SP}$, since r and $\xi$ are independent, an average signal to interference and noise ratio (SINR) loss of a receiver station (hereinafter referred to as a PS receiver station; for example, the PS terminal 14) of the primary system may be expressed as Formula (2) below.

[Math. 2]

$$\overline{SINR_{p,loss}} = 1 + \kappa(r_{ss}) \int_{-\infty}^{\infty} P_s(r_{ss}, \xi) 10^{\frac{\xi}{10}} f_{\xi_{sp}}(\xi) d\xi \quad (2)$$

where $$\kappa(r_{ss}) \triangleq G_{UE}^2 / N_p \mathbb{E}_\mathbf{n} \{G_{path,UE,UE}(r_{sp})\} \quad (3)$$

In Formula (2), $f_{\xi_{sp}}(\xi)$ represents a zero mean Gaussian distribution in a standard deviation $\sigma$ [dB] of the fading index. In Formula (3), $G_{UE}$ represents an antenna gain of the terminal, $N_p$ represents a noise power of the interfered device. En $\{G_{path, UE, UE}(r_{SP})\}$ is an expectation value of a path loss that is calculated over a joint probability density function of an internode distance expressed by Formula (1).

Here, an average signal to noise ratio (SIR) of a receiver station (hereinafter referred to as an SS receiver station) of the secondary system is a function of the fading index $\xi_{SP}$ and the distance $r_{SS}$ as expressed in the following formulas.

[Math. 3]

$$\overline{SIR_s(r_{ss}, \xi_{sp})} = P_s(r_{ss}, \xi_{sp})\chi(r_{ss}) \quad (4)$$

where $$\chi(r_{ss}) \triangleq \frac{G_{UE} e^{\left(\frac{ln10}{10}\sigma_{dB}\right)^2}}{P_P G_{BS}} G_{path,UE,UE}(r_{ss}) \cdot \mathbb{E}_\mathbf{n}\left\{\frac{1}{G_{path,BS,UE}(r_{ps})}\right\} \quad (5)$$

In Formula (5), $P_P$ represents the transmission power of the PS base station 10, $G_{BS}$ represents an antenna gain of the PS base station 10, and $G_{path, UE, UE}(r_{SS})$ represents a path loss between the SS transmitter station and the SS receiver station. En $\{1/G_{path, BS, UE}(r_{PS})\}$ is an expectation value of a reciprocal of the path loss that is calculated over the joint probability density function of the internode distance as in Formula (1).

From the Jensen's inequality, an upper bound of an ergodic capacity may be expressed as the following formula. In addition, the unit of the ergodic capacity is bps/Hz.

[Math. 4]

$$C_s^{up}(r_{ss}) = \int_{-\infty}^{\infty} \log_2(1 + \overline{SIR_s(r_{ss}, \xi_{sp})}) f_{\xi_{sp}}(\xi) d\xi \quad (6)$$

In the following description, suffixes are omitted for conciseness. A constrained optimization problem as in the following formulas is constructed in order to maximize the upper bound of the capacity of the secondary system.

[Math. 5]

$$\max_{P_s(\xi)} \int_{-\infty}^{\infty} \log_2(1 + P_s(\xi) \cdot \chi) f(\xi) d\xi \qquad (7)$$

$$\text{subject to } \int_{-\infty}^{\infty} P_s(\xi) 10^{\frac{\xi}{10}} f(\xi) d\xi \leq \gamma$$

where $$\gamma \triangleq (SINR_{loss,tol} - 1)/\kappa \qquad (8)$$

In Formula (8), $SINR_{loss,\,tol}$ is an allowance of an SINR loss of the primary system. $\kappa$ is an interference model parameter that is calculated according to Formula (3). A lagrangian for solution of the constrained optimization problem of Formula (7) is expressed as the following formula.

[Math. 6]

$$L(P_s(\xi), \lambda) = \qquad (9)$$
$$-\int_{-\infty}^{\infty} \log_2(1 + P_s(\xi) \cdot \chi) f(\xi) d\xi + \lambda \left( \int_{-\infty}^{\infty} P_s(\xi) 10^{\frac{\xi}{10}} f(\xi) d\xi - \gamma \right)$$

When the lagrangian is differentiated with $P_S(\xi)$, the following formula is derived.

[Math. 7]

$$\frac{\partial L(P_s(\xi), \lambda)}{\partial P_s(\xi)} = -\frac{1}{\ln 2} \frac{\chi}{1 + P_s(\xi)\chi} f(\xi) + \lambda 10^{\frac{\xi}{10}} f(\xi) = 0 \qquad (10)$$

$$\Rightarrow P_s(\xi) = \frac{1}{10^{\frac{\xi}{10}} \lambda \ln 2} - \frac{1}{\chi}$$

When $P_S(\xi)$ is solved with a constraint of $P_S(\xi) \geq 0$, a solution of the water filling principle that has a cutoff threshold value $\xi_0$ is derived as in the following formula.

[Math. 8]

$$P_s(r_{ss}, \xi_{sp}) = \begin{cases} \frac{1}{\chi}\left(10^{\frac{\xi_0-\xi_{sp}}{10}} - 1\right) & \text{if } \xi_{sp} < \xi_0 \\ 0 & \text{if } \xi_{sp} \geq \xi_0 \end{cases} \qquad (11)$$

Formula (11) indicates that the transmission power $P_S(r_{ss}, \xi_{SP})$ is zero in a period of time when the fading index $\xi_{SP}$ between an SS transmitter station (an interfering device) and a PS terminal (an interfered device) exceeds the cutoff threshold value $\xi_0$ [dB]. Accordingly, the constraint that an SINR loss observed in the PS terminal is less than the allowance $SINR_{loss,\,tol}$ is satisfied. The cutoff threshold value $\xi_0$ is calculated by solving the following relation formula that is described in a closed form.

[Math. 9]

$$\int_{-\infty}^{\xi_0} \left(10^{\frac{\xi_0}{10}} - 10^{\frac{\xi}{10}}\right) f(\xi) d\xi = \chi \cdot \gamma \qquad (12)$$

Also, when the zero mean Gaussian distribution (normal distribution) is assumed, Formula (12) may be equivalently substituted as in the following formula by using the given standard deviation $\sigma$ [dB] of the fading index $\xi_{SP}$.

[Math. 10]

$$10^{\xi_0/10}\left(1 - Q\left(\frac{\xi_0}{\sigma_{dB}}\right)\right) - e^{\left(\frac{\ln 10}{10}\sigma_{dB}\right)^2/2} \cdot \left(1 - Q\left(\frac{\xi_0}{\sigma_{dB}} - \frac{\ln 10}{10}\sigma_{dB}\right)\right) = \chi \cdot \gamma \qquad (13)$$

In Formula (13), $Q(\cdot)$ is a Q function of the tail probability of a standard normal distribution.

In the new interference model, the cutoff threshold value $\xi_0$ may be calculated by calculating the parameters $\kappa$ ($r_{SS}$), $\chi$ ($r_{SS}$), and $\gamma$ and solving Formula (12) or Formula (13). Then, the power calculation formula (Formula (11)) for calculation of the transmission power $P_S$ ($r_{SS}$, $\xi_{SP}$) may be constructed by using the calculated cutoff threshold value $\xi_0$. The argument of the power calculation formula (11) is the fading index $\xi_{SP}$ alone. Since the positional relation between the primary system and the secondary system is probabilistically assumed, an actual measured value of the path loss between the SS transmitter station and the PS terminal may not be used in constructing the power calculation formula.

In the technology of the present disclosure, after the power calculation formula of the interference model is constructed, the transmission power of the SS transmitter station is determined by using the fading index $\xi_{SP}$ that is estimated based on the relative movement of the interfering device.

(3) Estimation of Fading Index

The instantaneous value of the fading index may be estimated, for example, by using a least square-based fading estimation technique that will be described below. The least square-based fading estimation technique has been described, for example, in literatures such as "Experimental analysis of the joint statistical properties of azimuth spread, delay spread, and shadow fading" (A. Algans, K. I. Pedersen, and P. E. Mogensen, IEEE Journal on Selected Areas in Communication, vol. 20, no. 3, pp. 523-531, April 2002) and "Inter- and intrasite correlations of large-scale parameters from macrocellular measurements at 1800 mhz" (N. Jalden, P. Zetterberg, B. Ottersten, and L. Garcia, EURASIP Journal on Wireless Communications and Networking, 2007).

When the distance between the interfering device and the interfered device is d, a relation between a fading index $h_{sh}$ and a distance-dependent path loss $h_{ch}$ (d) in the least square-based fading estimation technique is expressed as the following formula.

[Math. 11]

$$10 \log_{10}(h_{ch}(d)) = A + B \log_{10}(d) + 10 \log_{10}(h_{sh}) \qquad (14)$$

It is assumed that the distance d is the sum of a reference distance $d_0$ and a change $d_i$ of a relative distance from the reference distance $d_0$ ($d = d_0 + d_i$). Then, Formula (14) is rewritten as follows.

[Math. 12]

$$10\log_{10}(h_{ch}(d)) = A + B\log_{10}(d_0 + d_i) + 10\log_{10}(h_{sh}) \quad (15)$$
$$= A + B\log_{10}(d_0) + B\log_{10}\left(1 + \frac{d_i}{d_0}\right) +$$
$$10\log_{10}(h_{sh})$$

Here, a Taylor expansion as in the following formula is established for x in the range of $-1<x\leq 1$.

[Math. 13]

$$\ln(1+x) = x - \frac{x^2}{2} + \frac{x^3}{3} - \frac{x^4}{4} + \ldots \quad (16)$$

Accordingly, when a Taylor expansion is performed on $\log_{10}(1+d_i/d_0)$ in the range of $-1<d_i/d_0\leq 1$ while focusing on the third term of Formula (15), the following approximation formula is established. Also, the third and subsequent terms of the Taylor expansion are neglected.

[Math. 14]

$$10\log_{10}(h_{ch}(d)) \approx a_0 + a_1 d_i + a_2 d_i^2 + 10\log_{10}(h_{sh}) \quad (17)$$
where
$$a_0 \stackrel{\Delta}{=} A + B\log_{10}(d_0),\ a_1 \stackrel{\Delta}{=} \frac{B}{d_0 \ln 10}\ \text{and}\ a_2 \stackrel{\Delta}{=} \frac{-B}{2d_0^2 \ln 10}$$

When Formula (17) is further generalized, the approximation formula is expressed as follows.

[Math. 15]

$$10\log_{10}(h_{ch}(d)) \approx a_0 + a_1 d_i + a_2 d_i^2 + \ldots + a_n d_i^n + 10\log_{10}(h_{sh}) \quad (18)$$

Here, m sets of the change $d_i$ of the relative distance from the reference distance $d_0$ and the reception power $P_1$ measured at the distance $d=d_0+d_i$ are prepared ($i=1, 2, \ldots, m$), the following simultaneous equation is constructed. Also, it is assumed that $|d_i|<d_0$ and m is sufficiently greater than n.

[Math. 16]

$$\underbrace{\begin{bmatrix} P_1 \\ P_2 \\ \vdots \\ P_m \end{bmatrix}}_{P} = \underbrace{\begin{bmatrix} 1 & d_1 & d_1^2 & \ldots & d_1^n \\ 1 & d_2 & d_2^2 & \ldots & d_2^n \\ \vdots & & & \vdots & \vdots \\ 1 & d_m & d_m^2 & \ldots & d_m^n \end{bmatrix}}_{D} \underbrace{\begin{bmatrix} a_0 \\ a_1 \\ \vdots \\ a_n \end{bmatrix}}_{a} \quad (19)$$

A coefficient vector $a=(a_0, a_1, \ldots, a_n)$ is given as a least square solution of Formula (19) as expressed in the following formula.

[Math. 17]

$$\hat{a} = (D^T D)^{-1} D^T p \quad (20)$$

As a result, when the coefficient vector $a=(a_0, a_1, \ldots, a_n)$ may be obtained in advance by solving the simultaneous equation of Formula (19), the instantaneous value of the fading index may be estimated from a vertical distance between the average reception power and the distance-dependent path loss estimation value estimated from the polynomial (18) with respect to the given relative distance $d_i$. Then, the transmission power of the SS transmitter station may be determined by substituting the estimated instantaneous value of the fading index into the power calculation formula (11).

Also, the instantaneous value of the fading index is not limited to the example described herein and may be estimated according to other methods.

2. Example of Configuration of Communication Control System

In this section, an exemplary embodiment of a communication control system that controls the transmission power of a secondary system by using the above-described interference model will be described.

[2-1. Overview of System]

Figure 4:
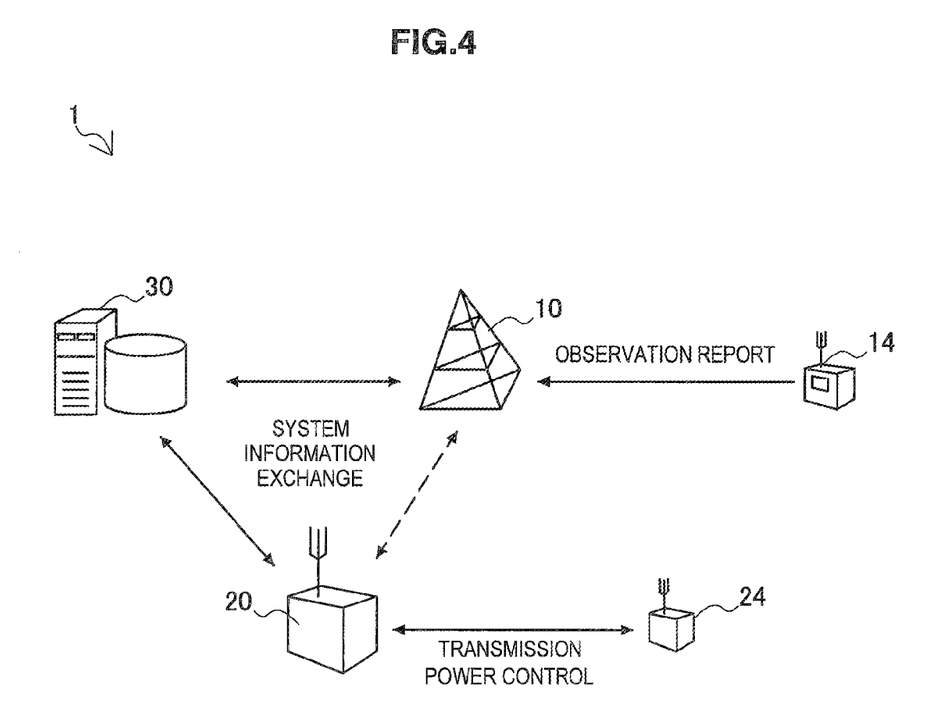
FIG. 4 is an illustrative diagram illustrating an example of a configuration of a communication control system according to an embodiment.

FIG. 4 is an illustrative diagram illustrating an example of a configuration of a communication control system 1 according to an embodiment. Referring to FIG. 4, the communication control system 1 includes a PS base station 10, a PS terminal 14, an SS base station 20, an SS terminal 24, and a data server 30.

The data server 30 is a server device that has a database that is equipped to manage the secondary use of a frequency channel by the secondary system. The data server 30 collects system information of the primary system from the PS base station 10. The system information collected from the PS base station 10 may include, for example, a position of the PS base station 10, a cell radius, an antenna gain, a noise power, a transmission power of the PS base station 10, an SINR loss allowance, and the like. Then, when the secondary system starts to operate, the data server 30 provides the system information of the primary system to the SS base station 20 in response to the request of the SS base station 20. The data server 30 may provide the SS base station 20 with information such as a spectrum mask and a frequency channel to be used by the secondary system. The communication between the SS base station 20 and the data server 30 may be performed, for example, through any network such as the Internet. Also, the SS base station 20 may directly receive the system information of the primary system from the PS base station 10.

In the present embodiment, the SS base station 20 functions as a communication control device that controls the transmission power of the SS base station 20 and the transmission power of the SS terminal 24. The SS base station 20 determines the transmission power of an SS transmitter station (for example, the SS base station 20 or the SS terminal 24) by using an instantaneous value of a fading index according to the above-described interference model. When a power calculation formula expressing a water filling principle is once constructed, only a fading index substituted into the constructed power calculation formula may be periodically updated in a short cycle. The power calculation formula may be reconstructed when interference exceeding an allowance (that is, an allowance violation) is observed in the primary system. The PS terminal 14 (or the PS base station 10) transmits an observation report on an interference amount periodically or when interference exceeding an allowance is observed. The SS base station 20 receives the observation report and may reconstruct (that is, modify) the power calculation formula when necessary. Accordingly, the protection of the primary system is reinforced.

Also, instead of the SS base station 20, the data server 30 or another node may operate as a communication control device that controls the transmission power of the secondary system.

[2-2. Example of Configuration of Communication Control Device]

Figure 5:
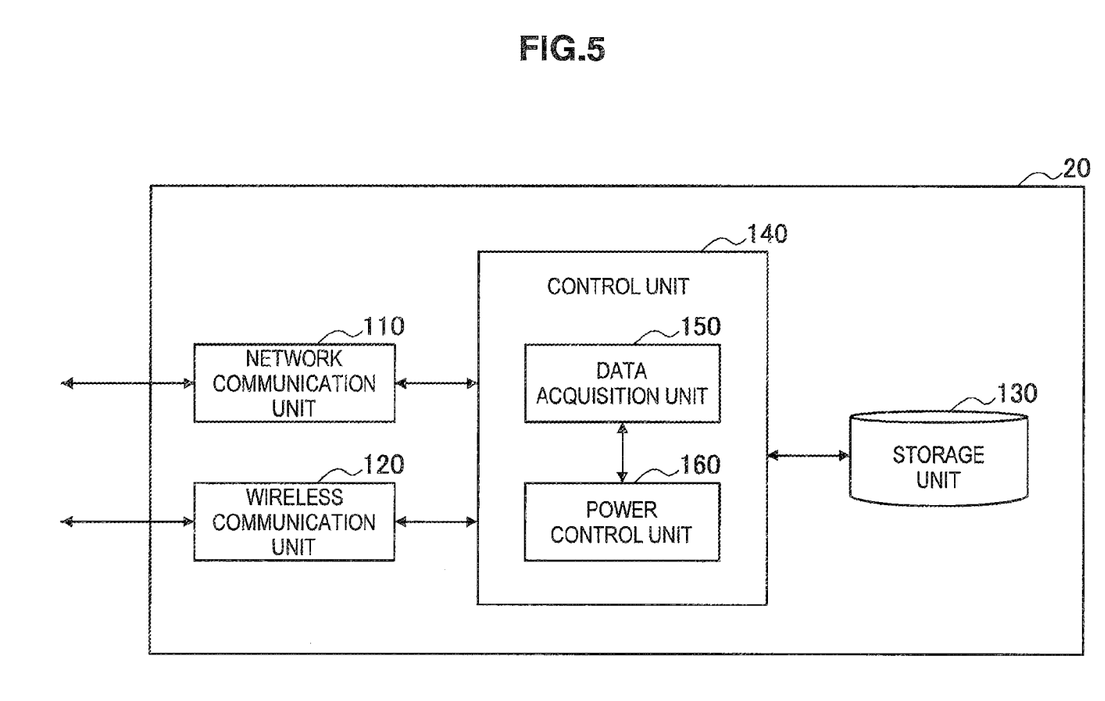
FIG. 5 is an illustrative diagram illustrating an example of a configuration of a communication control device.

FIG. 5 is an illustrative diagram illustrating an example of a configuration of a communication control device 20. Referring to FIG. 5, the communication control device 20 includes a network communication unit 110, a wireless communication unit 120, a storage unit 130, and a control unit 140. The control unit 140 includes a data acquisition unit 150 and a power control unit 160.

The network communication unit 110 is a communication interface for communication between the communication control device 20 and the data server 30. The communication between the communication control device 20 and the data server 30 may be implemented by wired communication, wireless communication, or a combination thereof.

The wireless communication unit 120 is a wireless communication interface for the communication control device 20 to provide a wireless communication service to one or more SS terminals 24. The wireless communication unit 120 transmits a wireless signal on a frequency channel that is protected for the sake of the primary system, by using the transmission power that may be determined according to the above-described interference model.

The storage unit 130 stores a program and data for operation of the communication control device 20 by using a storage medium such as a hard disk or a semiconductor memory. For example, the storage unit 130 stores the system information of the primary system that is received from the data server 30. Also, the storage unit 130 stores a parameter that is prepared or calculated to the transmission power of the secondary system.

The control unit 140 corresponds to a processor such as a central processing unit (CPU) or a digital signal processor (DSP). The control unit 140 activates various functions of the communication control device 20 by executing a program that is stored in the storage unit 130 or other storage media.

The data acquisition unit 150 acquires data that are necessary for the control of transmission power by the power control unit 160. For example, when the secondary system starts to operate, the data acquisition unit 150 acquires the system information of the primary system from the data server 30. Also, the data acquisition unit 150 acquires information such as the position, the antenna gain, and the maximum transmission power of the SS terminal 24 that joins in the secondary system.

The power control unit 160 determines the transmission power of a wireless signal that is transmitted from an interfering device of the secondary system, in order not to give interference exceeding an allowable level to an interfered device of the primary system. In addition, when a wireless signal is transmitted from the SS terminal 24 at the downlink transmission timing of the primary system, the SS terminal 24 is an interfering device and the PS terminal 14 is an interfered device. On the other hand, when a wireless signal is transmitted from the SS terminal 24 at the uplink transmission timing of the primary system, the PS base station 10 is an interfered device. When a wireless signal is transmitted from the SS base station 20, the SS base station 20 is an interfering device.

More specifically, the power control unit 160 determines the transmission power of the interfering device by using an instantaneous value of a fading index that is estimated based on a change in a relative distance between the interfering device and the interfered device according to the above-described interference model. The instantaneous value of the fading index is periodically estimated in a short cycle, and the transmission power is dynamically updated by using the estimated instantaneous value. The transmission power is determined by substituting the instantaneous value of the fading index into the above-described power calculation formula (11) expressing the water filling principle, for example. The cutoff threshold value $\xi_0$ of the power calculation formula is dependent on the deviation of fading and is calculated through the interference model parameters $\kappa$, $\chi$, and $\gamma$.

The instantaneous value of the fading index may be estimated in the communication control device 20. Alternatively, the instantaneous value of the fading index may be estimated in other devices (for example, the individual SS terminal 24). In the former case, the power control unit 160 periodically estimates the instantaneous value of the fading index about each interfering device based on a change in the relative distance of the interfering device, that is, the relative movement amount (from the reference point) corresponding to the above-described parameter $d_i$. In the latter case, the instantaneous value of the fading index is estimated by a device, and the estimated instantaneous value is transmitted from the device and is received by the network communication unit 110.

The power control unit 160 instructs each interfering device to use the dynamically-updated transmission power (or less transmission power). In the result, the communication capacity of the secondary system is optimized within such a range that the SINR loss expressed by Formula (2) does not exceed the SINR loss allowance of the primary system. However, the above-described interference model is based on a probabilistic method and does not zero out the risk of harmful interference. Therefore, the power control unit 160 reconstructs a power calculation formula when the dynamically-updated transmission power causes interference exceeding an allowance in the interfered device. The occurrence of the interference exceeding the allowance may be detected by receiving an observation report from the interfered device (for example, the PS terminal 14).

For example, the storage unit 130 prestores a mapping table that maps a quality indicator measured in the interfered device and a parameter constituting the power calculation formula. Herein, the quality indicator may be any indicator that is dependent on an interference amount. For example, the quality indicator may be an absolute interference amount, a relative interference amount about an allowable level, an absolute SINR loss, a relative SINR loss about an SINR loss allowance, or the like. The parameter constituting the power calculation formula may include, for example, one or more of the above-described interference model parameters $\kappa$, $\chi$, and $\gamma$ and the cutoff threshold value $\xi_0$. Then, when receiving the observation report from the interfered device, the power control unit 160 reconstructs a power calculation formula according to the quality indicator included in the observation report by reference to the mapping table stored in the storage unit 130. For example, when harmful interference exceeding the allowable level by $\Delta I$ is observed, the cutoff threshold value $\xi_0$ may be reduced by $\Delta I$.

[2-3. Flow of Process]

(1) Overall Flow

Figure 6:
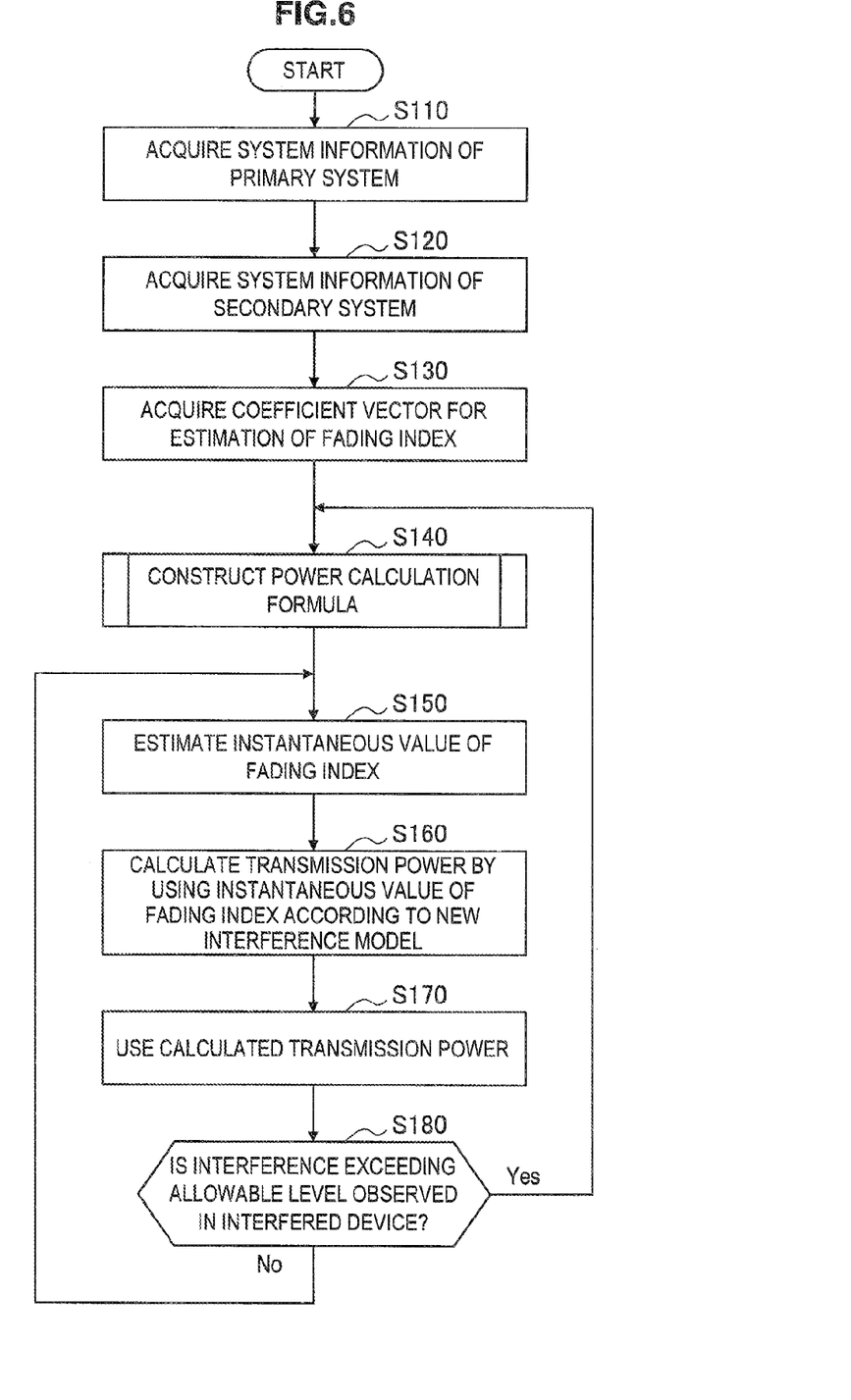
FIG. 6 is a flow chart illustrating an example of an overall flow of a communication control process.

FIG. 6 is a flow chart illustrating an example of an overall flow of a communication control process according to the present embodiment.

Referring to FIG. 6, first, when the secondary system starts to operate, the data acquisition unit 150 acquires system information of the primary system from the data server 30 (step S110). Also, the data acquisition unit 150 acquires system information of the secondary system, such as the antenna gain and the position of the interfering device (step S120).

Next, the power control unit 160 acquires a coefficient vector for estimation of a fading index (step S130). The coefficient vector may be precalculated as a least square solution of the above-described simultaneous equation (19) in a control initialization phase (or before it) based on a plurality of sets of measured reception power $P_i$ and a change $d_i$ in the relative distance of the interfering device.

Next, the power control unit 160 constructs a power calculation formula of the above-described interference model by using the information acquired in steps S110 and S120 (step S140). A detailed flow thereof will be further described later.

Next, the power control unit 160 estimates an instantaneous value $\xi_{SP}$ of the fading index about each interfering device by using a relative movement amount $d_i$ of each interfering device from the reference point and the coefficient vector acquired in step S130 (step S150). In addition, an instantaneous value $\xi_{SP}$ of the individual fading index may be estimated in each interfering device, and the estimated value may be reported to the communication control device 20.

Next, the power control unit 160 calculates the transmission power of each interfering device by substituting the estimated instantaneous value $\xi_{SP}$ of the fading index into the power calculation formula constructed in step S140, according to the new interference model (step S160). Here, the calculated transmission power is notified to each interfering device from the communication control device 20.

Next, by using the notified transmission power (or less transmission power), a wireless signal is transmitted from each interfering device (step S170). Here, the transmitted wireless signal acts as an interference signal of the primary system. However, since the transmission power is controlled according to the above-described interference model, an SINR loss of the primary system is suppressed below an SINR loss allowance unless a control error is large.

Next, the power control unit 160 determines whether interference exceeding the allowable level is observed in the interfered device as a result of the transmission of the wireless signal in step S170 (step S180). For example, when interference exceeding the allowable level is observed in the interfered device, an observation report notifying the occurrence of harmful interference may be received by the network communication unit 110.

When interference exceeding the allowable level is not observed, the process returns to step S150 and the estimation of the instantaneous value of the fading index and the calculation (update) of the transmission power are periodically repeated. When interference exceeding the allowable level is observed, the process returns to step S140 and the power calculation formula is reconstructed based on the quality indictor notified in the observation report.

(2) Construction of Power Calculation Formula

Figure 7:
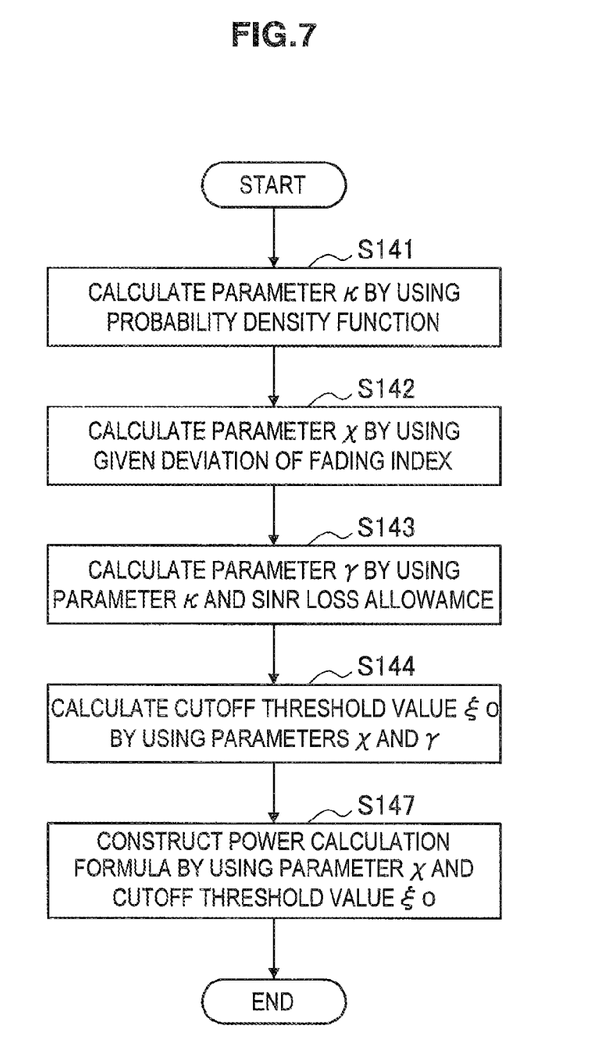
FIG. 7 is a flow chart illustrating an example of a detailed flow of a process for constructing a power calculation formula.

FIG. 7 is a flow chart illustrating an example of a detailed flow of a process for constructing a power calculation formula in step S140 of FIG. 6.

Referring to FIG. 7, first, the power control unit 160 calculates an interference model parameter κ by using an antenna gain of a terminal, a noise power of the primary system, and an expectation value of a path loss (which is not an actual measurement value but is probabilistically described) according to Formula (3) (step S141).

Next, the power control unit 160 calculates an interference model parameter χ by using a given standard deviation σ of the fading index according to Formula (5) (step S142).

Next, the power control unit 160 calculates an interference model parameter γ by using the SINR loss allowance and the interference model parameter κ calculated in step S141 according to Formula (8) (step S143).

Next, the power control unit 160 calculates a cutoff threshold value $\xi_0$ of the water filling principle by solving the relation formulas (12) or (13) described by using the interference model parameters χ and γ (step S144).

Next, the power control unit 160 constructs the power calculation formula (11) expressing the water filling principle by using the interference model parameter χ and the cutoff threshold value $\xi_0$ (step S147).

(3) Reconstruction of Power Calculation Formula

Figure 8:
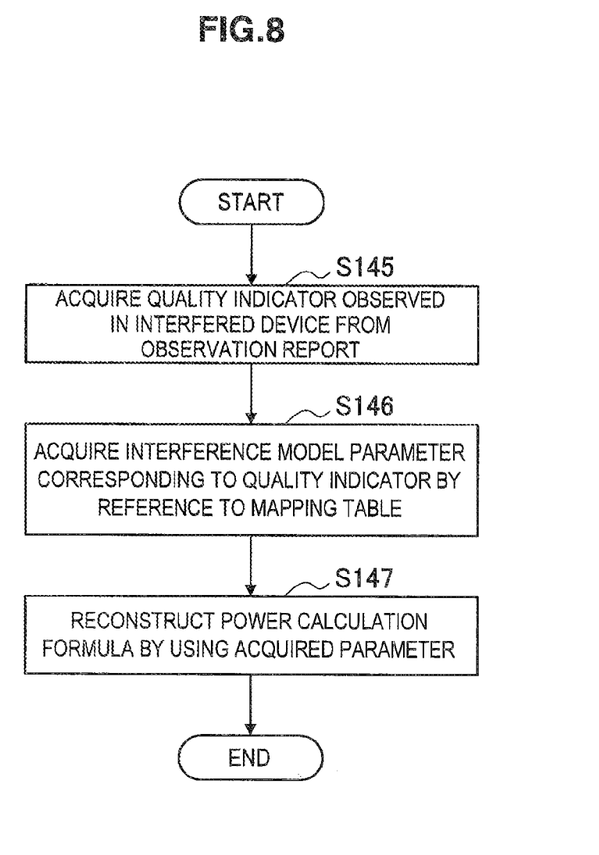
FIG. 8 is a flow chart illustrating another example of a detailed flow of a process for constructing a power calculation formula.

FIG. 8 is a flow chart illustrating another example of a detailed flow of a process for constructing a power calculation formula in step S140 of FIG. 6. For example, the process illustrated in FIG. 8 may be executed when the power calculation formula is reconstructed based on the quality indicator notified in the observation report.

Referring to FIG. 8, first, the power control unit 160 acquires the quality indicator observed in the interfered device from the observation report received by the network communication unit 110 (step S145).

Next, the power control unit 160 acquires the interference model parameter corresponding to the acquired quality indictor by reference to the mapping table prestored in the storage unit 130 (step S146). Herein, for example, it is assumed that the parameter χ and the cutoff threshold value $\xi_0$ are acquired.

Next, the power control unit 160 reconstructs the power calculation formula (11) expressing the water filling principle by using the interference model parameter χ and the cutoff threshold value $\xi_0$ (step S147).

3. Conclusion

Up to here, the embodiments of the technology of the present disclosure have been described in detail with reference to FIGS. 1 to 8. According to the above-described embodiments, the transmission power of the wireless signal transmitted from the interfering device is determined by using the fading index that is estimated based on the change in the relative distance between the interfering device and the interfered device. Therefore, a margin of a power increase generated by a path loss variation caused by fading may be efficiently used in the interfering device without accurately estimating a path loss between the systems by close signaling. Accordingly, the communication capacity of the secondary system using the frequency channel protected for the sake of the primary system may be optimized while suppressing an increase in the signaling overhead.

Also, according to the above-described embodiments, the transmission power is determined by substituting the instantaneous value of the fading index into the power calculation formula expressing the water filling principle. The instantaneous value of the fading index may be updated in a shorter cycle than the existing method. Thus, for example, the communication capacity may be increased by dynamically increasing the transmission power of the interfering device at the timing of the generation of a path loss exceeding an average value during a period of time. Also, the power calculation formula is derived by using the cutoff threshold value that is dependent on a deviation of fading. Therefore, harmful interference may be prevented from occurring in the interfered device, by zeroing out the transmission power of the interfering device at the timing when a path loss varying due to fading is small.

Also, according to the above-described embodiments, the power calculation formula is updated when the dynamically-updated transmission power causes interference exceeding an allowance. Thus, since the risk of harmful interference caused by an error in the interference model is reduced by a feedback loop from the interfered device, robuster interference control may be implemented. The power calculation formula may be updated by reference to the mapping table between the observed quality indicator and the interference model parameter. Therefore, the amount of data signaled for the sake of the feedback loop may be suppressed.

In terms of "secondary use", the wireless communication service of the primary system and the wireless communication service of the secondary system may be different types of services or may be the same type of services. The different types of wireless communication services may be, for example, two or more different types of wireless communication services selected from any services such as a digital TV broadcasting service, a satellite communication service, a mobile communication service, a wireless LAN access service, and a peer to peer (P2P) connection service. On the other hand, the same types of wireless communication services may include, for example, a relation between a macro cell service, which is provided by a communication service provider, and a femto cell service, which is operated by a user or a mobile virtual network operator (MVNO), in a mobile communication service. Also, the same type of communication services may include a relation between a service, which is provided by a base station, and a service, which is provided by a relay station (a relay node) to cover a spectrum hole, in a communication service based on WiMAX, LTE (Long Term Evolution), LTE-A (LTE-Advanced), or the like. In addition, the secondary system may use a plurality of fragmentary frequency bands that are aggregated by using a spectrum aggregation technology. In addition, the secondary system may be a femto cell group existing in a service area provided by a base station, a relay station group, or a small and medium-sized base station group that provides a smaller service area than a base station. The interference model described in this specification may be widely applied to all these types of secondary use modes.

Also, the interference model described in this specification is not limited to the purpose of secondary use of a frequency channel but may be applied to the purpose of various interference controls.

The calculation process described in this specification may be implemented by using software, hardware, or a combination of software and hardware. Programs constituting the software are prestored, for example, in a storage medium that is provided inside or outside the device. Then, for example, each program is loaded into a random access memory (RAM) and executed by a processor such as a CPU.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A communication control device including:

a power control unit configured to determine a transmission power of a wireless signal, which is transmitted from an interfering device, by using a fading index that is estimated based on a change in a relative distance between the interfering device and an interfered device.

(2)

The communication control device according to (1), wherein the power control unit determines the transmission power by substituting the fading index into a calculation formula that expresses a water filling principle.

(3)

The communication control device according to (2), wherein the calculation formula is derived by using a cutoff threshold value that is dependent on a deviation of fading.

(4)

The communication control device according to (2) or (3), wherein the power control unit dynamically updates the transmission power by using an instantaneous value of the fading index.

(5)

The communication control device according to (4), wherein the power control unit updates the calculation formula when the dynamically-updated transmission power causes interference exceeding an allowance in the interfered device.

(6)

The communication control device according to (5), wherein the power control unit updates the calculation formula by using a quality indicator that is observed in the interfered device and by reference to a mapping table that maps the quality indicator and a parameter constituting the calculation formula.

(7)

The communication control device according to any one of (1) to (6), wherein the fading index is estimated by substituting the change in the relative distance into an estimation formula that has coefficients that are precalculated based on a plurality of relative distances and a plurality of reception powers that are measured at the plurality of relative distances, respectively.

(8)

The communication control device according to any one of (1) to (7), wherein the interfered device is a receiver station of a primary system, and wherein the interfering device is a transmitter station of a secondary system that secondarily uses a frequency channel that is protected for the sake of the primary system.

(9)

The communication control device according to (8), wherein the communication control device is the transmitter station of the secondary system.

(10)

The communication control device according to (8), wherein the communication control device is a server device that manages the secondary use of the frequency channel.

(11)

The communication control device according to any one of (1) to (10), wherein the power control unit estimates the fading index based on the change in the relative distance.

(12)

The communication control device according to any one of (1) to (10), further including:

a communication unit configured to receive the estimated fading index from a device that has estimated the fading index based on the change in the relative distance.

(13)

A communication control method, which is executed by a communication control device that controls a transmission power of an interfering device, the communication control method including:

determining a transmission power of a wireless signal, which is transmitted from the interfering device, by using a fading index that is estimated based on a change in a relative distance between the interfering device and an interfered device.

(14)

A program for causing a computer, which controls a communication control device, to function as:

a power control unit configured to determine a transmission power of a wireless signal, which is transmitted from an interfering device, by using a fading index that is estimated based on a change in a relative distance between the interfering device and an interfered device.

(15)

A communication control system including:

a wireless communication device of a second wireless communication system located in a cell of a first wireless communication system; and a communication control device configured to determine a transmission power of a wireless signal, which is transmitted from the wireless communication device, not to give harmful interference to the first wireless communication system, by using a fading index that is estimated based on a change in a relative position of the wireless communication device.

REFERENCE SIGNS LIST 20 communication control device
110 network communication unit
120 wireless communication unit
130 storage unit
140 control unit
150 data acquisition unit
160 power control unit

The invention claimed is:

1. A communication control device, comprising:
power control circuitry configured to determine a transmission power of a wireless signal, which is transmitted from an interfering device, by using a fading index that is estimated based on a change in a relative distance between the interfering device and an interfered device, wherein the power control circuitry determines the transmission power by substituting the fading index into a calculation formula that expresses a water filling principle.

2. The communication control device according to claim 1,
wherein the calculation formula is derived by using a cutoff threshold value that is dependent on a deviation of fading.

3. The communication control device according to claim 1,
wherein the power control circuitry dynamically updates the transmission power by using an instantaneous value of the fading index.

4. The communication control device according to claim 3,
wherein the power control circuitry updates the calculation formula when the dynamically-updated transmission power causes interference exceeding an allowance in the interfered device.

5. The communication control device according to claim 4,
wherein the power control circuitry updates the calculation formula by using a quality indicator that is observed in the interfered device and by reference to a mapping table that maps the quality indicator and a parameter constituting the calculation formula.

6. The communication control device according to claim 1,
wherein the interfered device is a receiver station of a primary system, and
wherein the interfering device is a transmitter station of a secondary system that secondarily uses a frequency channel that is protected for the sake of the primary system.

7. The communication control device according to claim 6,
wherein the communication control device is the transmitter station of the secondary system.

8. The communication control device according to claim 6,
wherein the communication control device is a server device that manages the secondary use of the frequency channel.

9. The communication control device according to claim 1,
wherein the power control circuitry estimates the fading index based on the change in the relative distance.

10. The communication control device according to claim 1, further comprising:
communication circuitry configured to receive the estimated fading index from a device that has estimated the fading index based on the change in the relative distance.

11. A communication control device, comprising:
power control circuitry configured to determine a transmission power of a wireless signal, which is transmitted from an interfering device, by using a fading index that is estimated based on a change in a relative distance between the interfering device and an interfered device, wherein the fading index is estimated by substituting the change in the relative distance into an estimation formula that has coefficients that are precalculated based on a plurality of relative distances and a plurality of reception powers that are measured at the plurality of relative distances, respectively.

12. The communication control device according to claim 11,
wherein the calculation formula is derived by using a cutoff threshold value that is dependent on a deviation of fading.

13. The communication control device according to claim 11,
wherein the power control circuitry dynamically updates the transmission power by using an instantaneous value of the fading index.

14. The communication control device according to claim 13,
wherein the power control circuitry updates the calculation formula when the dynamically-updated transmission power causes interference exceeding an allowance in the interfered device.

15. The communication control device according to claim 14,
wherein the power control circuitry updates the calculation formula by using a quality indicator that is observed in the interfered device and by reference to a mapping table that maps the quality indicator and a parameter constituting the calculation formula.

16. The communication control device according to claim 11,
wherein the interfered device is a receiver station of a primary system, and
wherein the interfering device is a transmitter station of a secondary system that secondarily uses a frequency channel that is protected for the sake of the primary system.

17. The communication control device according to claim 16,
wherein the communication control device is the transmitter station of the secondary system.

18. The communication control device according to claim 16,
wherein the communication control device is a server device that manages the secondary use of the frequency channel.

19. The communication control device according to claim 11,
wherein the power control circuitry estimates the fading index based on the change in the relative distance.

20. The communication control device according to claim 11, further comprising:
communication circuitry configured to receive the estimated fading index from a device that has estimated the fading index based on the change in the relative distance.

21. A communication control method, which is executed by a communication control device that controls a transmission power of an interfering device, the communication control method comprising:
determining a transmission power of a wireless signal, which is transmitted from the interfering device, by using a fading index that is estimated based on a change in a relative distance between the interfering device and an interfered device, wherein the transmission power is determined by substituting the fading index into a calculation formula that expresses a water filling principle.

22. A non-transitory computer-readable medium encoded with instructions for causing a computer, which controls a communication control device, to function as:
a power control unit configured to determine a transmission power of a wireless signal, which is transmitted from an interfering device, by using a fading index that is estimated based on a change in a relative distance between the interfering device and an interfered device, wherein the power control unit is further configured to determine the transmission power by substituting the fading index into a calculation formula that expresses a water filling principle.

23. A communication control system comprising:
a wireless communication device of a second wireless communication system located in a cell of a first wireless communication system; and
a communication control device configured to determine a transmission power of a wireless signal, which is transmitted from the wireless communication device, not to give harmful interference to the first wireless communication system, by using a fading index that is estimated based on a change in a relative position of the wireless communication device, wherein the communication control device is further configured to determine the transmission power by substituting the fading index into a calculation formula that expresses a water filling principle.

24. A communication control method, which is executed by a communication control device that controls a transmission power of an interfering device, the communication control method comprising:
determining a transmission power of a wireless signal, which is transmitted from the interfering device, by using a fading index that is estimated based on a change in a relative distance between the interfering device and an interfered device, wherein the fading index is estimated by substituting the change in the relative distance into an estimation formula that has coefficients that are precalculated based on a plurality of relative distances and a plurality of reception powers that are measured at the plurality of relative distances, respectively.

25. A non-transitory computer-readable medium encoded with instructions for causing a computer, which controls a communication control device, to function as:
a power control unit configured to determine a transmission power of a wireless signal, which is transmitted from an interfering device, by using a fading index that is estimated based on a change in a relative distance between the interfering device and an interfered device, wherein the fading index is estimated by substituting the change in the relative distance into an estimation formula that has coefficients that are precalculated based on a plurality of relative distances and a plurality of reception powers that are measured at the plurality of relative distances, respectively.

26. A communication control system comprising:
a wireless communication device of a second wireless communication system located in a cell of a first wireless communication system; and
a communication control device configured to determine a transmission power of a wireless signal, which is transmitted from the wireless communication device, not to give harmful interference to the first wireless communication system, by using a fading index that is estimated based on a change in a relative position of the wireless communication device, wherein the fading index is estimated by substituting the change in the relative distance into an estimation formula that has coefficients that are precalculated based on a plurality of relative distances and a plurality of reception powers that are measured at the plurality of relative distances, respectively.

* * * * *